United States Patent [19]

Noske

[11] Patent Number: 4,751,575
[45] Date of Patent: Jun. 14, 1988

[54] METHOD OF TIMING SAMPLING FREQUENCY PULSES FOR DIGITIZING AND STORING COLOR TELEVISION SIGNALS REPRODUCED FROM MAGNETIC TAPE

[75] Inventor: Reiner Noske, Darmstadt, Fed. Rep. of Germany

[73] Assignee: Robert Bosch GmbH, Stuttgart, Fed. Rep. of Germany

[21] Appl. No.: 914,120

[22] Filed: Oct. 1, 1986

[30] Foreign Application Priority Data

Oct. 3, 1985 [DE] Fed. Rep. of Germany ....... 3533311

[51] Int. Cl.⁴ .............................................. H04N 5/06
[52] U.S. Cl. .................................... 358/148; 358/150; 358/319
[58] Field of Search ............... 358/148, 150, 152, 319, 358/320, 337, 338, 138, 336; 360/36.1, 36.2

[56] References Cited

U.S. PATENT DOCUMENTS 4,215,376 7/1980 Mach .............................. 358/148 X
4,392,159 7/1986 Lemoine et al. .................... 358/319

Primary Examiner—Howard W. Britton
Assistant Examiner—Victor R. Kostak
Attorney, Agent, or Firm—Frishauf, Holtz, Goodman & Woodward

[57] ABSTRACT

A highly stable clock pulse frequency (f2), which may be locked to a central clock pulse source of a broadcasting studio, is used to clock digital color television signals out of a buffer memory (1) and is also frequency multiplied by a factor (n). The output of the frequency multiplier (10) is divided by the same factor (n) in a synchronous divider (11) which counts out every nth pulse and to which horizontal synchronization pulses derived from tape recorded television signals are supplied at a reset input of the synchronous divider. The output (f1=f3/n) of the synchronous divider is used both for clocking the analog to digital converter which converts the color television signals picked up from the tape into digital signals and for clocking the entry of those digital signals into the buffer memory (1). Resetting of the divider by horizontal synchronizing pulses containing the same timing errors as the digital signals put into the buffer memory, causes the divider to begin a fresh counting cycle on the next positive flank of a frequency-multiplied clock pulse (f3), thus correcting the timing errors except for a possible residual timing error which is less than the oscillation period of the frequency multiplied clock pulses, which can be made smaller by using a higher multiplication and division factor (n).

2 Claims, 1 Drawing Sheet

Fig. 2

METHOD OF TIMING SAMPLING FREQUENCY PULSES FOR DIGITIZING AND STORING COLOR TELEVISION SIGNALS REPRODUCED FROM MAGNETIC TAPE

This invention concerns a method for timing sampling frequency pulses for processing color televison signals in reproducing them from a magnetic record by converting them into digital signals for temporary storage from which they can be read out with different timing for correction of timing errors involved in reproduction from the tape.

It is known to correct time base errors arising from recording or reproduction, or both, of color television signals on a magnetic tape by subjecting the signals during reproduction to analog to digital conversion and then writing them in as digital words in a temporary memory from which they are then read out at a constant frequency so that after digital to analog conversion they can be further processed as time-base-corrected video signals.

In order to carry out the time base error corections, it is necesssary for the phase of the frequency of sampling in analog to digital conversion and of the writing in to the temporary memory should fluctuate with the time base error, whereas the rhythm for reading out the temporarily stored signals is performed at a highly constant rhythm of pulses that, for example, are electronically locked to a studio frequency standard. To obtain the sampling pulses for the analog to digital conversion and the pulses for timing the writing of the digital words into the temporary memory, a start-stop oscillator is in general used. This oscillator is shocked into oscillation by horizontal synchronizing pulses derived from the video signal picked up from the tape and then runs either free or in a controlled manner for the duration of the following televison line. In order that the sampling of the active line may be carried out with the necessary precision, the start-stop oscillator must fulfill two mutualy opposed requirements, the simultaneous fulfillment of which involves substantial difficulty: the oscillations must completely die out before the end of the brief blanking interval and start up with the beginning of a defined pulse flank without substantial transient effects, and at the same time they must have a high frequency stability. The first main requirement can be fulfilled with LC oscillators which, however, have less stability than quartz-controlled oscillators which accordingly take longer to reach a steady state oscillation. Poor frequency stability becomes noticeable in reproduced pictures as fluctuation in television line lengths, so that vertical edges appear torn (mouse teeth effect); this effect is particularly marked at the right hand edge portion of the picture.

A method for deriving the phase of a sampling frequency that fluctuates in the rhythm of the timing errors of the reproduced signal, is known, for example, from U.S. Pat. No. 4,392,159. In that case, an error signal is obtained from the difference between the desired and actual sampling rhythm phase and the phase of the sampling pulse signal is shifted to an extent determined by the magnitude of the error signal, in the direction that tends to bring the measured error towards zero.

SUMMARY OF THE INVENTION

It is an object of the present invention to provide a sampling rhythm in which the timing fluctuates with the timing errors of the reproduced television signals while the rhythm also has a higher frequency stability in every television line than what can be obtained with LC oscillators.

Briefly, the sampling frequency for analog to digital conversion and writing the converted video signals into a temporary memory is derived from a highly stable frequency used for readout from the temporary memory, by frequency multiplication followed by frequency division in a frequency divider of the digital counter type to which reset pulses are supplied which have the same timing errors as the video signals to be processed. Such reset pulses are easily obtainable from horizontal synch signals. In this manner, the frequency stability of the pulses used for analog to digital conversion and for writing the digital signals into the temporary memory have a highly constant frequency derived from a quartz-stabilized time base which nevertheless is quickly shifted in phase in respone to fluctuation of the time base errors affecting the signals picked up from a tape.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
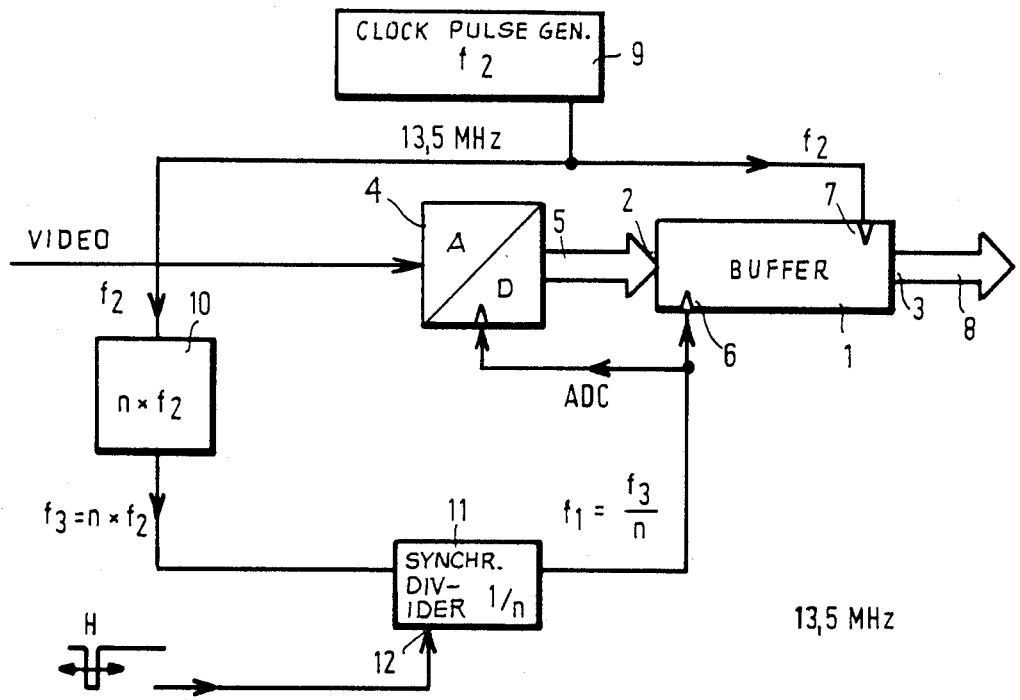
FIG. 1 is a circuit block diagram of apparatus for deriving the sampling rhythm pulses from the highly stable readout frequency pulses in accordance with the invention.

FIG. 1 shows a temporary or "buffer" memory 1 for storing digital data used for correcting timing errors, which operates according to the FIFO (first in-first out) principle which is advantageous to use here. FIG. 1 accordingly shows the memory 1 as operating to store the data sequentially by writing the digital words into the write input of the memory 1 so that they can be read out in the same sequence as the readout digital output 3 in the same sequence. Although the symbolic representation of the memory 1 is similar to that used in shift registers for passing storage of analog data values, the temporary memory 1 can be a write-read memory of any kind operable with separate write and read clocking. The digital video data 5 which are to be freed from timing errors are supplied to the data input tube of the memory 1 and can be taken out from the output 3 as digital video signals 8 free of timing errors.

Write-in clock pulses are supplied to a first clock input 6 of the memory 1, pulses have the same timing as the pulses supplied as sampling pulses to the analog to digital converter 4 that provides digital signals 5 to the input 2 of the memory 1. These write-in and sampling pulses are impressed with the timing errors to which the video data signals 5 are subject, for the known reasons already mentioned.

A quartz-stabilized clock pulse generator 9 delivers clock pulses of a constant frequency f2, for example, 13.5 MHz. Preferably, the clock pulse generator 9 is electronically locked to a central studio clock pulse source. The clock pulses of frequency f2 are, on the one hand supplied with the readout clock input 7 of the memory 1 and, on the other hand, are supplied to a frequency multiplier 10 which provides frequency multiplication by an integral factor n, for example the factor 8, to produce clock pulses f3 at 108 MHz. The clock pulses f3 are then supplied to a synchronous frequency divider 11 which divides the clock pulse frequency f3 by the same factor n by which the frequency f2 was multiplied in the multiplier 10. Horizontal synchronizing pulses are, however, supplied to the reset input 12 of the synchronous frequency divider 11, which is of the kind that counts out every nth pulse to produce an output, normally resetting itself after every nth pulse. The horizontal synchronizing pulses supplied at the reset input 12 are derived from the video signals supplied to the analog to digital converter 4 by circuits of a well known kind not shown in FIG. 1, so that they are subject to the same timing errors as those of the analog video signals and of the digital signal 5 derived therefrom. As already mentioned, the highly quartz-stabilized clock pulses f2, which in the usual case are locked to a central studio pulse source, are supplied to the readout clock input 7 of the memory 1 so that the data signal 8 which are read out of the memory 1 may provide digital video data free of timing errors.

Figure 2:
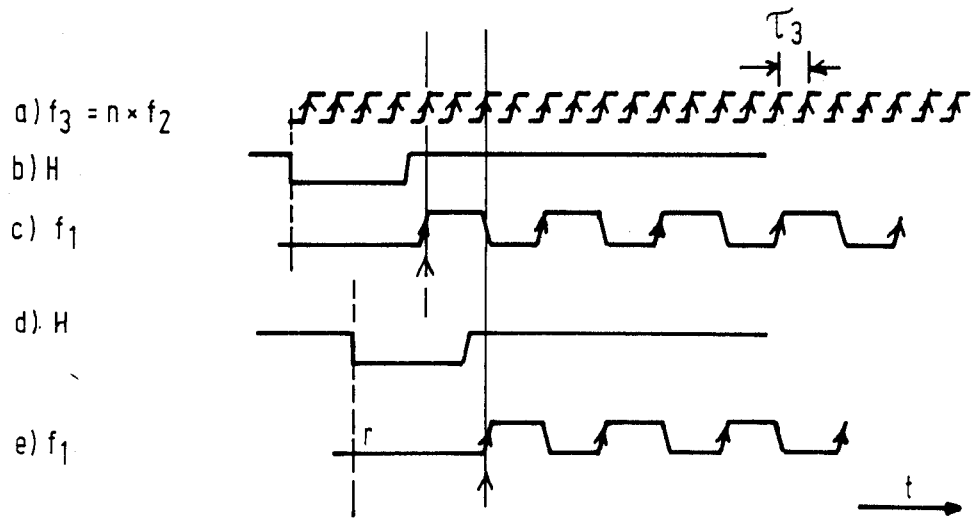
FIG. 2 is a timing diagram illustrating pulses produced in the circuit of FIG. 1.

The manner of operation of the circuit of FIG. 1 is illustrated by the timing diagram given in FIG. 2, in which various wave forms are shown to the same time base at superposed levels a, b c, d, and e.

On line a there are shown the frequency multiplied clock pulses f3 having a cycle period T3=T2/n which is considerably smaller than the period $\tau 2$ of the pulses of the sampling rate f1. In order to the simplify the drawing, the frequency multiplied clock pulses f3 are shown as only doubled in frequency (n=2) compared to the sampling rate frequency.

On line b of FIG. 2 a first position of a horizontal synchronizing pulse is shown which is supplied to the reset input 12 of the synchronous frequency divider 11. The trailing edge of the horizontal synchronizing pulse then allows the synchroncous divider 11 to start operating as soon as the first following positive flank of the frequency multiplied clock pulses f3 appears as shown in line c of FIG. 2.

In line d of FIG. 2, another position of the reset pulse appearing at the reset input 12 is shown. The frequency devider 11 is likewise started with its trailing edge. The reset pulse then produces a definite synchronizing of the sampling pulses shown on line e of FIG. 2 to a rising (positive) flank of a clock pulse f3. The divider 11 accordingly begins functioning with that first positive flank of the clock pulses f3 (top line in FIG. 2) after the rising flank of the reset pulse shown in line d of FIG. 2.

And the sampling pulses then continue at fixed frequency as shown on line e) of FIG. 2.

The manner of operation just described leaves a residual error, resulting from the defined possible starting instants of the frequency divider 11 at the respective instants of the rising flanks of the clock pulses f3, but that residual error is sufficiently small with sufficiently high frequency of the frequency multiplied clock pulses f3. The maximum residual error corresponds essentially to the period of the frequency multiplied sampling pulses f3. For the above described example, in which n=8 and f3=108 MHz, there is a residual timing error of $\tau 3 = 1/(f3) = 9.25$ nsec. This error is practically invisible in the reproduced television picture and also less disturbing than a picture width that is not constant.

The sampling clock pulses f1 obtained by the circuit of FIG. 1 in accordance with the invention, has the great advantage of having a frequency that is constant over the time period of a television line and thereby provides a stable picture width.

Although the invention has been described with reference to a particular illustrative example, it will be recognized that variations and modification are possible within the inventive concept.

I claim:

1. Method of deriving first clock pulses (f1) for sampling an analog television signal to produce digital television signals and for timing the entry of said digital signals into a buffer memory from which they are read out at a highly constant rate by second clock pulses (f2) from a pulse source of constant frequency with correction of timing errors in said television signals resulting from variation of the rate of said first clock pulses to accord with said timing errors, comprising the steps of:
    producing third clock pulses (f3) in response to said second clock pulses through frequency multiplication, by an integral factor (n), of said second clock pulses;
    producing fourth clock pulses through frequency division of said third clock pulses (f3) by said integral factor (n) in a synchronous frequency divider which repetitively counts out said factor (n) and which has an external reset input (12) for reset pulses having timing errors which are the same as said timing errors in said television signals, and
    applying said reset pulses to said reset input (12) to reset the counting out of said factor and thereby initiate a fresh counting out of said factor at the incidence of the first arrival of a pulse of said third pulses (f3) following the end of a said reset pulse, whereby the duration of the storage period of said digital signals in said buffer memory substantially corrects said timing errors.

2. Method according to claim 1, wherein said pulses supplied to said reset input (12) are horizontal synchronization pulses of said television signals.

* * * * *